(12) United States Patent
Knapp

(10) Patent No.: US 7,117,663 B2
(45) Date of Patent: Oct. 10, 2006

(54) AIR BREATHING, HYDROGEN FUELED JET ENGINE FOR HIGH SPEED AIRCRAFT

(76) Inventor: Jonathan Cleaveland Knapp, 925 Beach Comber La., Vero Beach, FL (US) 32963

( * ) Notice: Subject to any disclaimer, the term of this patent is extended or adjusted under 35 U.S.C. 154(b) by 90 days.

(21) Appl. No.: 10/853,449

(22) Filed: May 25, 2004

(65) Prior Publication Data
US 2006/0185347 A1 Aug. 24, 2006

(51) Int. Cl.
F02C 5/00 (2006.01)
F01C 1/02 (2006.01)

(52) U.S. Cl. .................. 60/269; 418/61.2
(58) Field of Classification Search .............. 60/246, 60/269, 726; 418/60, 61.2
See application file for complete search history.

(56) References Cited

U.S. PATENT DOCUMENTS

| 2,620,625 A | 12/1952 | Phaneut |
| 2,956,402 A | 10/1960 | Rae |
| 3,000,176 A | 9/1961 | Kuhrt |
| 3,237,401 A | 3/1966 | Peters et al. |
| 3,241,311 A | 3/1966 | Kuhrt |
| 3,705,496 A | 12/1972 | Wolf et al. |
| 3,744,940 A * | 7/1973 | Pierce et al. .................. 418/60 |
| 3,747,339 A | 7/1973 | Wolf et al. |
| 3,762,842 A * | 10/1973 | George ..................... 418/61.2 |
| 5,012,640 A | 5/1991 | Mirville |

OTHER PUBLICATIONS

NASA Liquid Hydrogen as a Propulsion Fuel, 1945-1959 NASA SP-4404 Part II Chapter 8 pp. 154-156 First Printed 1978 (declassified).

* cited by examiner

Primary Examiner—Louis J. Casaregola

(57) ABSTRACT

A hydrogen fueled jet engine for hypersonic aircraft. The compressor of the jet engine is driven directly by a dual-acting rotary piston engine. Heated, high pressure hydrogen is delivered to the rotary piston engine for expansion therein. The crankshaft of the rotary piston engine is attached directly to the air compressor of the jet engine. The power from the expanding hydrogen drives the air compressor of the jet engine. After the hydrogen is expanded to produce power, the hydrogen is burned as fuel.

12 Claims, 3 Drawing Sheets

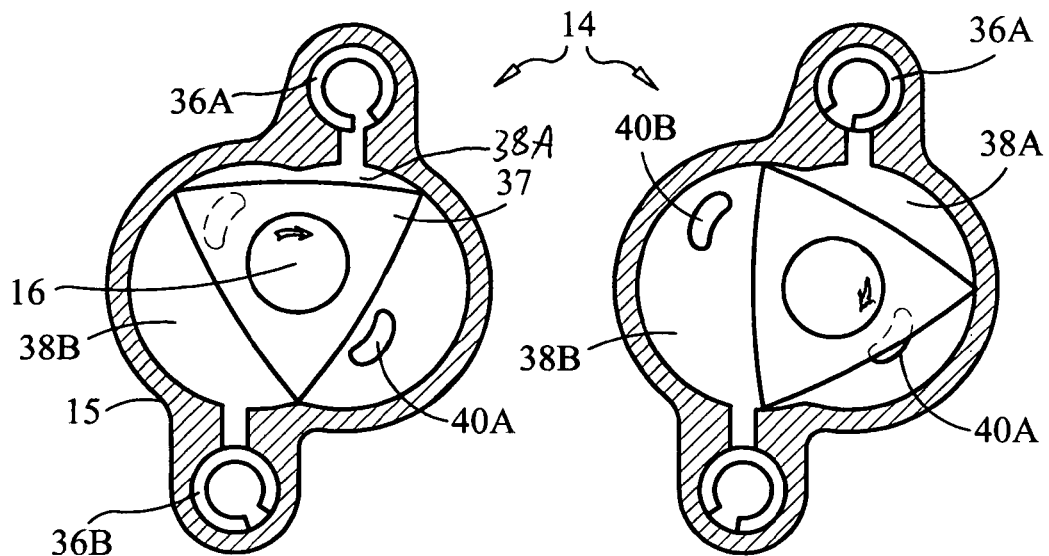
FIG. 2-1
TDC +360 DEGREES
FIG. 2-2
TDC +90 DEGREES
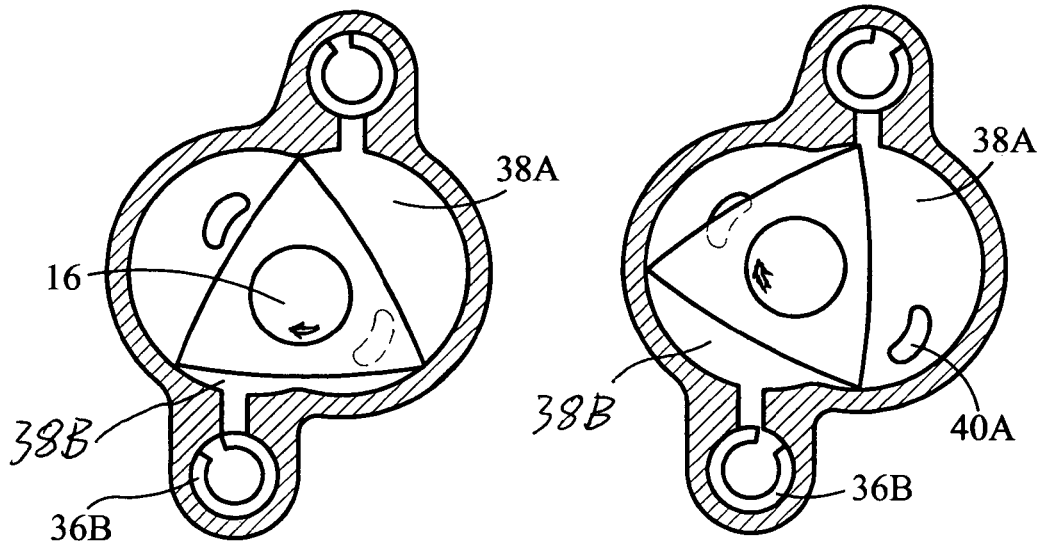
FIG. 2-3
TDC +180 DEGREES
FIG. 2-4
TDC +270 DEGREES

AIR BREATHING, HYDROGEN FUELED JET ENGINE FOR HIGH SPEED AIRCRAFT

BACKGROUND

1. Field of Invention

This invention relates to air-breathing, hydrogen fueled jet engines and specifically to a new hydrogen expanding mechanism to improve the efficiency and thrust of such engines.

2. Discussion of Prior Art

The air compressor of a conventional turbojet engine is powered by a turbine which expands combustion products. The turbine limits the turbojet in two ways. Firstly, as the combustion products expand through the turbine, the propulsive energy of the combustion products is greatly reduced. Secondly, turbine materials are temperature limited, which limits the maximum combustion temperature. When an aircraft accelerates to a sufficiently high supersonic speed, the temperature of air entering the combustion chamber will approach the temperature limit, and so little or no fuel can be burned without overheating the turbine.

A hydrogen fueled jet engine can obviate the turbine which expands combustion products. Instead of expanding combustion products, high pressure hydrogen is expanded in a turbine to produce the power needed for the air compressor. After the hydrogen expands to produce power, it is mixed with the compressed air in a combustion chamber where it is burned as fuel. Since there is no turbine to expand combustion products, all the energy of combustion contributes to propulsive thrust. Since there is no turbine to overheat in the combustion products, combustion temperature can be greatly increased.

U.S. Pat. No. 2,620,625 to Phaneuf, Dec. 9, 1952 describes a radial inflow reaction turbine driven by hydrogen. This turbine directly drives a centrifugal air compressor and a centrifugal hydrogen compressor to impel the hydrogen to a combustion chamber. U.S. Pat. No. 3,000,176 to Kuhrt, Sep. 19, 1961 describes a hero's wheel turbine (named for Hero, the ancient inventor). This turbine directly drives an axial flow compressor. U.S. Pat. No. 3,705,496 to Wolf et al, Dec. 12, 1972 and U.S. Pat. No. 3,747,339 to Wolf et al, Jul. 24, 1973 show an axial flow turbine directly driving an axial flow compressor. A heat exchanger in front of the compressor preheats the hydrogen while cooling the incoming air. Although cooling incoming air may increase compressor efficiency somewhat, it seems counterproductive to cool the air prior to heating it up again by the addition of fuel. U.S. Pat. No. 5,012,640 to Mirville, May 7, 1991 shows the hydrogen driven turbine mounted integrally with the rotor wheel of the axial air compressor stages. This engine would likely have serious problems with hydrogen leakage at the seals.

The abovementioned patents are all very inefficient because the sonic speed of sound in heated hydrogen is about five times that of the incoming air. A hydrogen turbine therefore needs to spin much faster than an air compressor. The following patents use a gearbox to allow for this.

U.S. Pat. No. 2,956,402 to Rae, Oct. 18, 1960 shows a three stage turbine with reheat between stages. Although theoretically a little more efficient than a single stage turbine (without reheat), the complexity makes it impractical. U.S. Pat. No. 3,237,401 to Peters et al, Mar. 1, 1966 shows a hydrogen turbine, gearbox, air compressor, and a hydrogen to hydrogen heat exchanger. Warm hydrogen exiting the turbine is cooled while passing through the heat exchanger, while the cold liquid hydrogen from the fuel tank is gasified and preheated. Although the heat exchanger is stated to be lightweight, it seems counterproductive to cool the fuel just before burning it for heat value. U.S. Pat. No. 3,241,311 to Kuhrt, Mar. 22, 1966 shows a turbine driving a compressor through a gearbox, and two axially spaced fuel manifolds (injectors). A proportioning valve between the two fuel manifolds helps control overheating. The Model 304 Engine (described in NASA SP-4404, chapter 8–9) is quite similar to U.S. Pat. No. 3,241,311. To the inventors knowledge, the Model 304 is the only hydrogen expanding jet engine to actually be built and tested. An 18 stage hydrogen expanding turbine powered a four stage axial flow air compressor through a reduction gear. It had two fuel injection manifolds with a heat exchanger between them. The amount of hydrogen injected and burned by the first manifold was controlled to limit the temperature of the combustion gasses which entered the heat exchanger. The remaining hydrogen was injected at the second manifold beyond the heat exchanger. The hydrogen expanding turbine was very highly developed, yet the claimed efficiency was about 50%, which seems rather low. The reduction gear may have been partly to blame for this. Since the Model 304 turbine was highly developed, the other hydrogen turbines referenced above would undoubtedly be much less than 50% efficient.

OBJECTS AND ADVANTAGES

Accordingly an object and advantage of my invention is to provide a new hydrogen fueled jet engine which does not use a hydrogen expansion turbine. Another object of my invention is to expand the hydrogen more efficiently than a turbine, and to harness the power of expansion directly to the air compressor with no reduction gear. A further object of this invention is to provide a hydrogen fueled jet engine with increased thrust.

Further objects and advantages will become apparent from a consideration of the drawings and ensuing description thereof.

SUMMARY

An air-breathing hydrogen fueled jet engine for high speed aircraft, space launch vehicles, and single stage to orbit aerospace vehicles. Hydrogen is expanded in a dual-acting rotary piston engine to provide power for the air compressor of the jet engine.

DRAWINGS

FIGS. 2-1, 2-2, 2-3, 2-4 are cross sectional views substantially on line 2—2 of FIG. 1

FIG. 3 shows an optional hydrogen turbine

---

Figure 1:
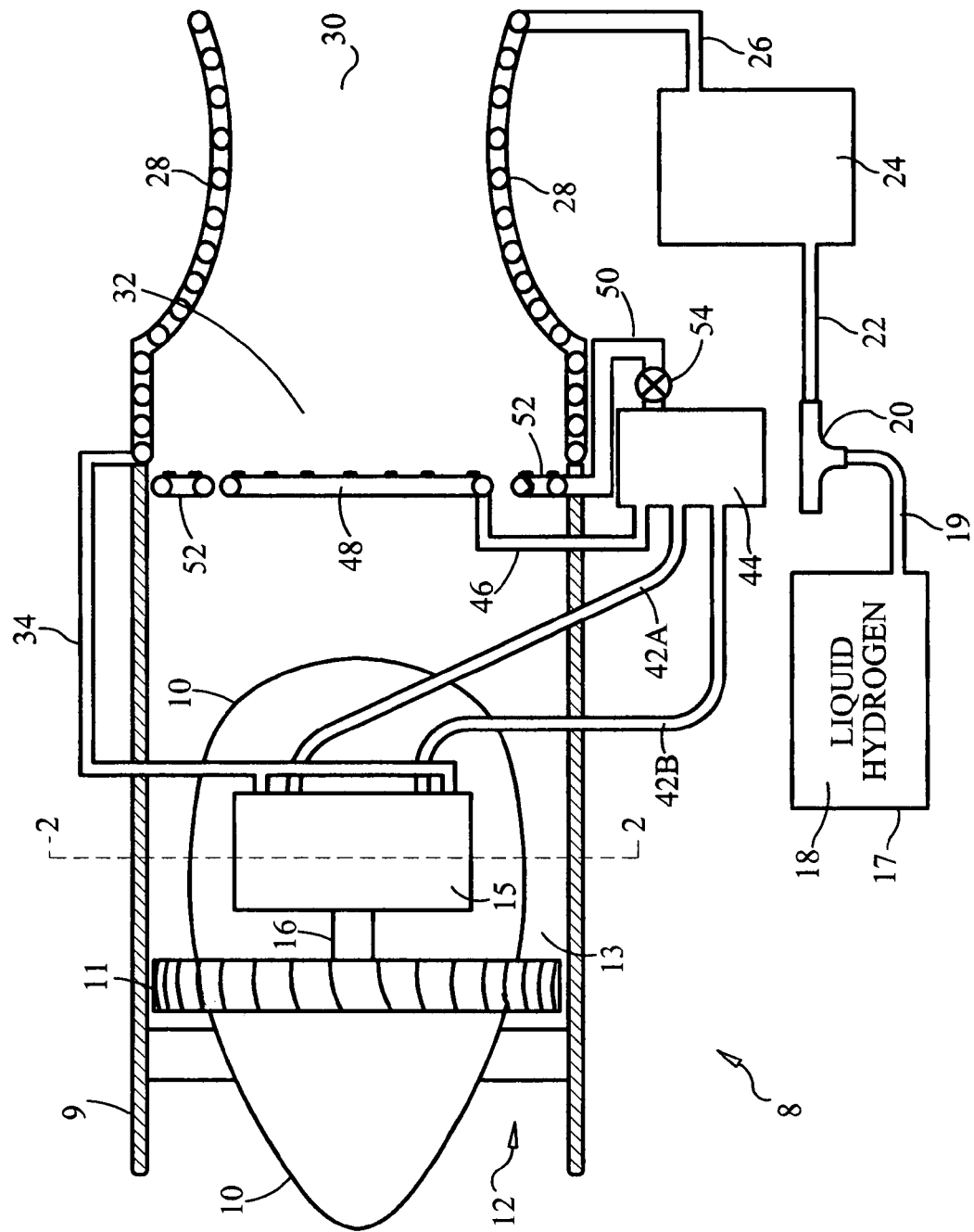
FIG. 1 is a plan view of my air breathing, hydrogen expansion jet aircraft engine

Reference Numerals 8 air-breathing, hydrogen fueled jet aircraft engine
9 outer casing
10 inner body
11 air compressor
12 annular air inlet
13 compressed air outlet38A,
14 dual-acting, hydrogen expanding rotary piston engine
15 rotary engine housing
16 rotary engine crankshaft (eccentric -continued Reference Numerals 17 fuel tank
18 liquid hydrogen
19 pipe to high pressure liquid hydrogen pump
20 high pressure liquid hydrogen pump
22 pipe to first heat exchange system
24 first heat exchange system
26 pipe to second heat exchanger
28 second heat exchanger
30 nozzle
32 combustion chamber
34 pipe to rotary intake valves
36A, 36B rotary intake valves
37 rotary piston
38B expansion chambers
40A, 40B outlet ports
42A, 42B outlet pipes
44 plenum chamber
46 pipe to inner fuel manifold
48 inner fuel manifold
50 pipe to outer fuel manifold
52 outer fuel manifold
54 valve
56 turbine

DESCRIPTION AND OPERATION

Air-Breathing, Hydrogen Fueled Jet Aircraft Engine

A hydrogen expansion jet aircraft engine 8 is generally indicated in FIG. 1 as having an outer casing 9 and an inner body 10. A single or multi-stage air compressor 11 is supported by inner body 10. An annular air inlet 12 is defined between outer casing 9 and inner body 10 on the left hand side of compressor 11. A compressed air outlet 13 is similarly defined on the right hand side of compressor 11. Inner body 10 also supports a dual-acting, hydrogen expanding rotary piston engine 14 (FIGS. 2-1, 2-2, 2-3, and 2-4). A rotary engine housing 15 supports a rotary engine crankshaft (eccentric) 16 for rotation within housing 15. Compressor 11 is connected to crankshaft 16, and is therefore driven directly by rotary piston engine 14.

A fuel tank 17 contains liquid hydrogen 18 at low pressure. A pipe 19 conducts hydrogen 18 from fuel tank 17 to a high pressure liquid hydrogen pump 20. Liquid hydrogen 18 is pressurized by pump 20. A pipe 22 conducts the pressurized liquid hydrogen 18 from pump 20 to a first heat exchange system 24. First heat exchange system 24 is shown as a simple rectangle because it can take many forms, depending on the particular application. Generally, liquid hydrogen 18 is gasified and pre-warmed in first heat exchange system 24 by removing heat from the lubricants, coolants, surfaces, and components of the aircraft powered by jet engine 8. First heat exchange system 24 could also include a section which burns any type of fuel with air to preheat the gasified hydrogen 18 to a predetermined minimum temperature. A pipe 26 conducts the gasified hydrogen 18 from first heat exchange system 24 to a second heat exchanger 28 which surrounds a nozzle 30 and a combustion chamber 32. Heat exchanger 28 further heats the gasified hydrogen 18.

Description of Dual-Acting, Hydrogen Expanding Rotary Piston Engine for Powering Compressor 11 FIGS. 2-1, 2-2, 2-3, 2-4

Figure 3:
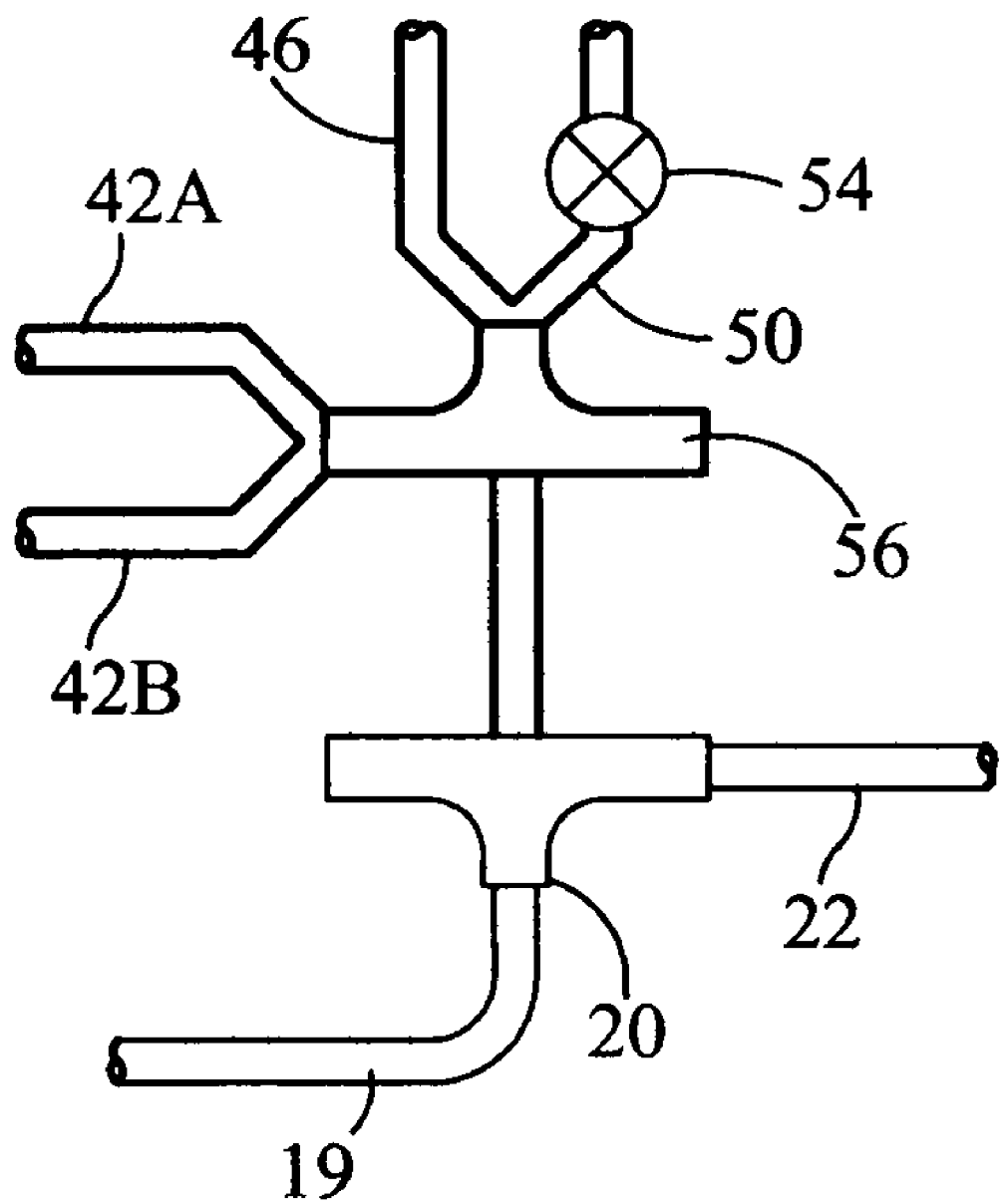

A pipe 34 conducts the gaseous, heated, high pressure hydrogen 18 from heat exchanger 28 to two rotary intake valves 36A and 36B. Intake valves 36A and 36B are driven at the same rotational speed as crankshaft 16 by chain and sprockets (not shown). In FIGS. 2-1 a rotary piston 37 is positioned at what can be considered top dead center (hereinafter abbreviated TDC). FIG. 2-1 shows intake valve 36A opening to allow the heated, high pressure hydrogen 18 to enter an expansion chamber 38A. Intake valve 36A is open for a period of time equal to about ninety degrees of rotation for crankshaft 16. FIG. 2-2 shows intake valve 36A closing. Expansion chamber 38A then continues to expand (FIGS. 2-3) until an outlet port 40A opens (FIGS. 2-4). The expanded hydrogen in expansion chamber 38A then discharges through port 40A. FIGS. 2-3 shows intake valve 36B opening to allow the heated, high pressure hydrogen 18 to enter an expansion chamber 38B. Intake valve 36B is also open for a period of time equal to about ninety degrees of rotation for crankshaft 16. FIGS. 2-4 shows intake valve 36B closing. Expansion chamber 38B continues to expand as in FIGS. 2-1 until an outlet port 40B opens (FIG. 2-2). The expanded hydrogen in expansion chamber 38B then discharges through port 40B. The two ports (40A, and 40B) shown in the right hand side of housing 15 provide ample port area for most applications of rotary engine 14. If some engine applications require greater port area then ports can also be placed on the left hand side of housing 15 (not shown but clearly understood).

Expanded hydrogen 18 which discharges through ports 40A and 40B is conducted to a plenum chamber 44 via two outlet pipes 42A and 42B, respectively. When ports 40A and 40B open strong acoustic pulses (waves of positive pressure) emerge from these ports. These acoustic pulses travel at sonic velocity towards plenum 44. Pipes 42A and 42B must be kept separate to avoid interfering with each other. If they were joined together to form a single pipe then when port 40A opens the acoustic pulse emerging from port 40A would enter expansion chamber 38B through port 40B. This is undesirable because expansion chamber 38B is still discharging. When port 40B opens a similar pulse would enter expansion chamber 38A through port 40A. It would be much preferable if there were a low pressure pulse at ports 40A and 40B during a substantial portion of their respective discharge periods. This preferred condition exists if three conditions are met. Firstly, pipes 42A, and 42B should be separate, as mentioned above (and shown in FIG. 1). Secondly, the volume of plenum 44 should be sufficiently large so that the strong positive pulses entering plenum 44 from the open ends of pipes 42A, and 42B are reflected back through their respective pipes 42A and 42B as rarefactions (waves of negative pressure). About ten times the expanded volume of one expansion chamber (38A or 38B) is sufficient. These rarefactions go back through pipes 42A, and 42B to exhaust ports 40A, and 40B respectively. Thirdly, the length of pipes 42A, and 42B should be such that the rarefactions arrive at exhaust ports 40A, and 40B during the exhaust periods of their respective expansion chambers 38A, and 38B. The optimal length of pipes 42A, and 42B is mainly a function of the rotational speed of crankshaft 16 and the speed of sound waves in hydrogen 18. However, the exact length and shape of pipes 42A and 42B should be determined empirically for any particular design of jet engine 8.

Since both expansion chambers 38A, and 38B expand hydrogen 18 to produce power, rotary piston engine 14 is very powerful. Since there is an expansion of hydrogen at 180 degree intervals, that power is very smooth. Since the expansion of hydrogen 18 in expansion chambers 38A, and 38B is essentially an isentropic (adiabatic) process, the power produced by that expansion should be nearly 100% efficient. Since crankshaft 16 drives compressor 11 directly (no reduction gearing) the overall efficiency of rotary piston engine 14 should be similarly high (probably about 90% efficient).

A pipe 46 conducts hydrogen 18 from plenum 44 to an inner fuel manifold 48. Inner fuel manifold 48 mixes hydrogen 18 with the compressed air (from air outlet 13) for burning in the central portion of combustion chamber 32. Extremely high temperatures can be reached in this central portion of combustion chamber 32 because there is no turbine to be overheated by combustion products. A pipe 50 conducts hydrogen 18 from plenum 44 to an outer fuel manifold 52. Outer fuel manifold mixes hydrogen 18 with the compressed air (from air outlet 13) for burning in the outer portion of combustion chamber 32. A valve 54 is placed in pipe 50. Closing valve 54 reduces the amount of hydrogen 18 delivered to outer fuel manifold 52, thus helping to prevent overheating of heat exchanger 28. Valve 54 is substantially open when the aircraft powered by jet engine 8 is traveling at subsonic or low supersonic speed, because there is little danger of overheating. However, valve 54 closes as the speed of the aircraft powered by jet engine 8 increases hypersonically because aerodynamic heating increases significantly while the temperature of air entering combustion chamber 32 also increases greatly. At these times other cooling methods (not shown) can be used to cool the walls of combustion chamber 32 and nozzle 30. For instance relatively cool water vapor could be injected adjacent to these walls. After combustion of hydrogen 18 with air the hot gasses accelerate through nozzle 30 to provide thrust.

Alternatively, pipes 42A and 42B lead to a turbine 56 (FIG. 3) where hydrogen 18 is further expanded before being burned. The power produced by turbine 56 can be used to drive pump 20 and, or to drive other accessories (not shown) of the jet aircraft powered by jet engine 8.

Some parts of jet engine 8 can be built with less weight by replacing single components with many smaller components. For instance, suppose that the single rotary piston engine 14 is replaced by an array of one hundred geometrically similar units, each with one percent the power of the single rotary piston engine 14. The laws of geometric similitude dictate that all the dimensions of the smaller units would be about one tenth that of the single rotary piston engine 14. The overall (summed) weight of the one hundred smaller units will be about one tenth that of the single rotary piston engine 14 because each of the smaller units would weigh about one thousandth the weight of the single rotary piston engine 14. The same reasoning applies to the single compressor 11. The overall weight of one hundred geometrically similar but smaller compressors (each with one percent the air handling capacity of the single compressor 11) would be about one tenth that of the single compressor 11. However not all of the components of jet engine 8 scale down so advantageously. Many components of jet engine 8 are best left as single units.

Thus the reader will see that the jet engine of this invention is powerful, simple, lightweight, and capable of operation at hypersonic speed.

While my above description contains many specificities, these should not be construed as limitations on the scope of the invention, but rather as an exemplification of one preferred embodiment thereof. Many other variations are possible. For example compressor 11 is shown as an axial flow compressor but a centrifugal (radial flow) compressor could be used. A single rotary piston 37 is shown in rotary piston engine 14 but two or more rotary pistons can be used. If two or more rotary pistons are used, then the number of expansion chambers (38A, and 38B), intake valves (36A, and 36B), and other components will also increase commensurably. Rotary intake valves (36A, and 36B) are shown but other types of intake valves (such as poppet valves) can be used. Inner fuel manifold 48 and outer fuel manifold 52 are shown, but more than two fuel manifolds can be used. A single fuel manifold can also be used. A fuel cell to generate electricity can be incorporated with this invention. Various valves can be used to control the flow of hydrogen 18, air, or the other fluids associated with jet engine 8. Nozzle 30 is shown with a fixed geometry but mechanisms to vary the geometry can (and generally should) be used. Housing 15 is shown without a cooling system because the hydrogen which enters rotary engine 14 is not extremely hot. Although the lubrication system (not shown) of rotary engine 14 provides adequate cooling for rotary engine 14, additional cooling systems (such as a water jacket for liquid cooling) can be incorporated. Fuel tank 17 is shown positioned externally to jet engine 8, but fuel tank 17 (and other components of the aircraft) can be positioned within inner body 10. Hydrogen 18 within fuel tank 17 is shown in a liquid state but the state of hydrogen 18 can be gaseous, frozen solid, partly frozen, slushy, or condensed (as a Boze-Einstein condensate). Hydrogen has several unique characteristics such as high specific heat, high thermal conductivity, low density, high sonic speed, and rapid combustion. Although these characteristics make hydrogen uniquely advantageous for this invention, fuels other than hydrogen can be used.

Accordingly, the scope of this invention should be determined not by the embodiments illustrated, but by the appended claims, and their legal equivalents.

The invention claimed is:

1. A dual-acting rotary piston engine for powering a means to compress the air entering a jet aircraft engine, comprising:
   a) a rotary engine housing, said housing having two sides,
   b) a crankshaft mounted for rotation within said housing,
   c) a rotary piston mounted for rotation on said crankshaft,
   d) two expansion chambers defined between the interior surfaces of said housing and the exterior surfaces of said rotary piston,
   e) intake valve means mounted near the periphery of said housing, said intake valve means being ductingly connected to each of said expansion chambers,
   f) two outlet ports disposed in one side of said housing, each of said expansion chambers having one of said outlet ports attached thereto,
   g) outlet pipes attached to said outlet ports during operation, one end of each of said pipes attached to one of said outlet ports, the other end of each of said pipes remaining open at all times during operation, all of said pipes having substantially the same optimal length, and strong acoustic pulses which exit said outlet ports during operation, said pulses traversing from said outlet ports to said open ends where they are reflected back to said outlet ports as rarefactions, whereby during operation timely opening of said intake valves inducts pressurized hydrogen gas to into said expansion chambers for expansion therein until said outlet ports open, whereby said reflected rarefactions exist at said outlet ports for a substantial portion of the time that said outlet ports are open, whereby expanding hydrogen produces useful power before being burned as fuel, and whereby power produced by said crankshaft supplies power to said means to compress the air entering a jet aircraft engine.

2. The invention of claim 1 further including a plenum chamber attached to the open ends of said outlet pipes during operation, said plenum having a sufficiently large volume to ensure that said strong positive pulses entering said plenum from said open ends are reflected back to said outlet ports as rarefactions.

3. The invention of claim 2 further including a fuel manifold means, said fuel manifold means connected to said plenum chamber during operation, whereby the hydrogen fuel from said outlet ports passes through said plenum chamber before reaching said fuel manifold means.

4. The invention of claim 3 wherein said fuel manifold means comprises an inner fuel manifold, an outer fuel manifold, and a valve, whereby during operation the closing of said valve reduces the amount of hydrogen fuel which is delivered to said outer fuel manifold.

5. The invention of claim 3 wherein said fuel manifold means comprises multiple fuel manifolds.

6. The invention of claim 1, further including a turbine connected to said outlet ports, whereby the hydrogen fuel is further expanded in said turbine to produce power.

7. The invention of claim 1 further including a pump connected to said engine for pressurizing liquid hydrogen during operation, and a heat exchange means to gasify and to heat the hydrogen, whereby during operation heated gaseous hydrogen is delivered to said intake valves.

8. The invention of claim 1 wherein said outlet ports are disposed on both sides of said housing, whereby each of said expansion chambers has two of said outlet ports disposed thereon.

9. The invention of claim 1 wherein more than one rotary piston is mounted for rotation on said crankshaft for increased power, whereby the numbers of other components of said rotary engine will also increase commensurably.

10. An air breathing, hydrogen fueled jet engine for high speed aircraft comprising:

A) a dual-acting rotary piston engine, said rotary piston engine comprising:
   a) a rotary engine housing, said housing having two sides,
   b) a crankshaft mounted for rotation within said housing,
   c) a rotary piston mounted for rotation on said crankshaft,
   d) two expansion chambers defined between the interior surfaces of said housing and the exterior surfaces of said rotary piston,
   e) intake valves means mounted near the periphery of said housing, said intake valve means being ductingly connected to each of said expansion chambers,
   f) two outlet ports disposed in one side of said housing, and B) a jet engine air compressor which is connected directly to said crankshaft during operation, said air compressor having an air inlet and a compressed air outlet, whereby during operation timely opening of said intake valves inducts pressurized hydrogen gas into said expansion chambers for expansion therein until said outlet ports open, whereby during operation power produced by said crankshaft compresses the air which enters said air inlet, and compressed air issues from said compressed air outlet.

11. The invention of claim 10 wherein said outlet ports are disposed on both sides of said housing, whereby each of said expansion chambers has two of said outlet ports disposed thereon.

12. The invention of claim 10 wherein more than one rotary piston is mounted for rotation on said crankshaft for increased power, whereby the numbers of other components of said rotary engine will also increase commensurably.

* * * * *